US012559019B2

(12) United States Patent
Salter et al.

(10) Patent No.: US 12,559,019 B2
(45) Date of Patent: Feb. 24, 2026

(54) ACCESSORY ATTACHMENT AND LOCKING SYSTEM FOR CONNECTION TO A BASE PLATE

(71) Applicant: Ford Global Technologies, LLC, Dearborn, MI (US)

(72) Inventors: Stuart C. Salter, White Lake, MI (US); Matthew B. Rutman, Westland, MI (US); Eric Scott Levine, Novi, MI (US); David Brian Glickman, Southfield, MI (US); Michael M. Azzouz, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 540 days.

(21) Appl. No.: 17/993,345

(22) Filed: Nov. 23, 2022

(65) Prior Publication Data

US 2024/0166121 A1     May 23, 2024

(51) Int. Cl.
B60P 7/08 (2006.01)
B60R 9/06 (2006.01)
(Continued)

(52) U.S. Cl.
CPC .......... B60P 7/0807 (2013.01); B60P 7/0815 (2013.01); B60R 9/06 (2013.01); B60R 11/06 (2013.01); B62D 33/023 (2013.01)

(58) Field of Classification Search
CPC .... B62D 33/0207; B62D 33/023; B60R 9/06; B60R 11/06; B60P 7/0815; B60P 7/0807;
(Continued)

(56) References Cited

U.S. PATENT DOCUMENTS

| | | | | |
|---|---|---|---|---|
| 4,085,961 A | | 4/1978 | Brown | |
| 5,588,631 A | * | 12/1996 | Yee .......................... | B60R 11/06 |
| | | | | 224/547 |

(Continued)

FOREIGN PATENT DOCUMENTS

| | | | | | |
|---|---|---|---|---|---|
| KR | 20010066513 A | * | 7/2001 | ............. | E05B 83/18 |
| WO | WO-2013014878 A1 | * | 1/2013 | ........ | H01M 10/4207 |

OTHER PUBLICATIONS

US 10,947,009 B2, 03/2021, Brunner et al. (withdrawn)

*Primary Examiner* — Daniel J Colilla
(74) *Attorney, Agent, or Firm* — Carlson, Gaskey & Olds, P.C.

(57) ABSTRACT

An accessory attachment system includes a base plate that provides a plate attachment interface and at least one accessory including an accessory attachment interface to connect to the plate attachment interface. In one example, the accessory attachment interface comprises at least one mounting foot that has a predefined shape to pull the at least one accessory against a side wall mounted base plate as the foot is inserted into an aperture in the base plate and moved vertically to a mounted position. In one example, a locking mechanism that is separate from the mounting foot is movable between a locked position where the accessory is prevented from being removed from the base plate and an unlocked position where the at least one accessory is allowed to be removed from the base plate. In one example, there is a power connection interface between the base plate and the accessory, and there is at least one accessory locking mechanism powered via the power connection interface to allow at least one of a handle and a lid to be placed in a locked condition.

22 Claims, 9 Drawing Sheets

(51) Int. Cl.
B60R 11/06 (2006.01)
B62D 33/023 (2006.01)

(58) Field of Classification Search
CPC ... A47B 57/487; A47B 47/50; A47B 87/0207;
A47B 87/0276
See application file for complete search history.

(56) References Cited

U.S. PATENT DOCUMENTS

| | | | |
|---|---|---|---|
| 5,727,835 A | | 3/1998 | Krush et al. |
| 6,481,604 B1 * | | 11/2002 | Beene ....................... B60R 9/00 |
| | | | 224/543 |
| 10,000,161 B2 | | 6/2018 | Hemphill et al. |
| 10,583,962 B2 | | 3/2020 | Brunner et al. |
| 10,629,016 B1 * | | 4/2020 | Helm ..................... B60R 9/065 |
| 10,703,534 B2 | | 7/2020 | Brunner et al. |
| D895,966 S | | 9/2020 | Brunner et al. |
| D895,967 S | | 9/2020 | Brunner et al. |
| D896,517 S | | 9/2020 | Brunner et al. |
| D896,518 S | | 9/2020 | Brunner et al. |
| D897,103 S | | 9/2020 | Brunner et al. |
| D898,320 S | | 10/2020 | Brunner et al. |
| 10,962,218 B2 | | 3/2021 | Plato et al. |
| 10,981,696 B2 | | 4/2021 | Brunner et al. |
| D917,977 S | | 5/2021 | Brunner et al. |
| D918,584 S | | 5/2021 | Brunner et al. |
| D919,296 S | | 5/2021 | Brunner et al. |
| 11,008,136 B2 | | 5/2021 | Brunner et al. |
| D920,671 S | | 6/2021 | Brunner et al. |
| 11,027,883 B1 | | 6/2021 | Brunner et al. |
| D923,935 S | | 7/2021 | Brunner et al. |
| 11,192,690 B1 | | 12/2021 | Brunner et al. |
| 11,268,691 B2 | | 3/2022 | Plato et al. |
| 11,365,026 B2 | | 6/2022 | Brunner et al. |
| 11,427,382 B2 | | 8/2022 | Brunner et al. |
| 11,465,805 B2 | | 10/2022 | Brunner et al. |
| 2009/0200351 A1 | | 8/2009 | Brallier et al. |
| 2010/0320245 A1 * | | 12/2010 | Vilkomirski ............. B25H 3/02 |
| | | | 224/404 |
| 2017/0209318 A1 * | | 7/2017 | Schroeder ............ F16M 13/022 |
| 2018/0244186 A1 * | | 8/2018 | Knox ........................ B60P 7/15 |
| 2020/0223349 A1 | | 7/2020 | Zanca |
| 2021/0155146 A1 * | | 5/2021 | Yabushita ............. B60P 7/0807 |
| 2022/0111798 A1 | | 4/2022 | Neely, III |
| 2022/0349432 A1 * | | 11/2022 | Gardner ................. F16B 21/12 |

* cited by examiner

ACCESSORY ATTACHMENT AND LOCKING SYSTEM FOR CONNECTION TO A BASE PLATE

TECHNICAL FIELD

This disclosure relates generally to an attachment and locking system and, more particularly, to an attachment and locking system that is used to secure accessories to a base plate.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment system, including: a base plate configured to be positioned within a vehicle cargo area that has a floor surface and at least one side wall extending upwardly from the floor surface in a vertical direction, and wherein the base plate includes at least one plate portion that is associated with the at least one side wall; a plate attachment interface located on an outwardly facing surface of the at least one plate portion; at least one accessory comprising at least an accessory side wall extending in the vertical direction, the accessory side wall including an accessory attachment interface to connect to the plate attachment interface; and wherein one of the plate attachment interface and the accessory attachment interface comprises at least one mounting foot and the other of the plate attachment interface and the accessory attachment interface comprises at least one aperture, and wherein the at least one mounting foot has a predefined shape that is configured to pull the at least one accessory against the base plate as the at least one mounting foot is inserted into the at least one aperture and moved vertically to a mounted position.

In some aspects, the techniques described herein relate to an accessory attachment system, wherein the at least one mounting foot comprises a plurality of mounting fee and wherein the at least one aperture comprises a plurality of apertures, and where each foot comprises a base body that extends to a distal end that is spaced from the accessory side wall by a gap that receives an edge portion of a corresponding aperture to attach the accessory to the base plate.

In some aspects, the techniques described herein relate to an accessory attachment system, wherein each foot is covered in a plastic material.

In some aspects, the techniques described herein relate to an accessory attachment system, wherein the distal end extends downwardly from the base body to form the predefined shape as a hook, and wherein the gap decreases in size in a direction away from the distal end such that the gap is narrower at the base body than at the distal end.

In some aspects, the techniques described herein relate to an accessory attachment system, the system including a locking mechanism that is separate from the plate attachment interface and the accessory attachment interface, and wherein the locking mechanism is movable between a locked position where the at least one accessory is prevented from being removed from the base plate and an unlocked position where the at least one accessory is allowed to be removed from the base plate.

In some aspects, the techniques described herein relate to an accessory attachment system, wherein the locking mechanism comprises a button that is resiliently biased to extend into a corresponding button opening on the base plate when the at least one mounting foot is fitted into the at least one aperture to provide the locked position.

In some aspects, the techniques described herein relate to an accessory attachment system, the system including an actuator that slides the button in a direction transverse to the vertical direction to compress a resilient member to move the button to the unlocked position, or an actuator that moves in the vertical direction to unlock the button.

In some aspects, the techniques described herein relate to an accessory attachment system, wherein the at least one accessory comprises a container that includes at least one handle and/or a lid, and including: a power connection interface between the base plate and the at least one accessory to provide power to the at least one accessory, and at least one locking mechanism powered via the power connection interface to allow at least one of the handle and the lid to be placed in a locked condition where the handle or the lid cannot be moved relative to the container or an unlocked condition where the handle or the lid can be moved relative to the container.

In some aspects, the techniques described herein relate to a method, including: a method of attaching the at least one accessory to the base plate in any configuration as described above, the method further including inserting the at least one foot into the at least one aperture, and moving the at least one accessory in the vertical direction to hook the at least one accessory to the base plate.

In some aspects, the techniques described herein relate to an accessory attachment system, including: a base plate that provides a plate attachment interface on an outwardly facing surface; at least one accessory including an accessory attachment interface to connect to the plate attachment interface; one of the plate attachment interface and the accessory attachment interface comprises at least one mounting foot and the other of the plate attachment interface and the accessory attachment interface comprises at least one aperture, wherein the at least one mounting foot is inserted into the at least one aperture to connect the at least one accessory to the base plate; and a locking mechanism separate from the at least one foot and the at least one aperture, the locking mechanism being movable between a locked position where the at least one accessory is prevented from being removed from the base plate and an unlocked position where the at least one accessory is allowed to be removed from the base plate.

In some aspects, the techniques described herein relate to an accessory attachment system, wherein the locking mechanism comprises a mechanical locking mechanism configured to be actuated by user input.

In some aspects, the techniques described herein relate to an accessory attachment system, wherein the locking mechanism comprises a button that is resiliently biased to extend into a corresponding button opening on the base plate when the at least one mounting foot is fitted into the at least one aperture to provide the locked position.

In some aspects, the techniques described herein relate to an accessory attachment system, wherein the locking mechanism includes an actuator that slides the button in a direction transverse to a vertical direction to compress a resilient member to move the button to the unlocked position, or an actuator that moves in the vertical direction to unlock the button.

In some aspects, the techniques described herein relate to an accessory attachment system, wherein the base plate is configured to be positioned within a vehicle cargo area that has a floor surface and at least one side wall extending upwardly from the floor surface in a vertical direction, and wherein the base plate includes at least one plate portion that is associated with the at least one side wall, and wherein the at least one accessory includes at least an accessory side wall extending in a vertical direction, and wherein the plate attachment interface is located in the at least one plate portion and the accessory attachment interface is located in the accessory side wall.

In some aspects, the techniques described herein relate to an accessory attachment system, wherein the at least one accessory comprises a container that includes at least one handle and/or a lid, and including: a power connection interface between the base plate and the at least one accessory to provide power to the at least one accessory, and at least one accessory locking mechanism powered via the power connection interface to allow at least one of the handle and the lid to be placed in a locked condition where the handle or the lid cannot be moved relative to the container or an unlocked condition where the handle or the lid can be moved relative to the container.

In some aspects, the techniques described herein relate to a method, including: a method of locking the at least one accessory to the base plate in any configuration as described above, the method further including locking the at least one accessory to the base plate by biasing a lock button to extend into a corresponding lock button opening in the base plate as the at least one mounting foot is inserted into the at least one aperture and moved to a mounted position.

In some aspects, the techniques described herein relate to an accessory attachment system, including: a base plate that provides a plate attachment interface on an outwardly facing surface; at least one accessory including an accessory attachment interface to connect to the plate attachment interface, and wherein the at least one accessory comprises a container that includes at least one handle and/or a lid; a power connection interface between the base plate and the at least one accessory to provide power to the at least one accessory; and at least one accessory locking mechanism powered via the power connection interface to allow at least one of the handle and the lid to be placed in a locked condition where the handle or the lid cannot be moved relative to the container or an unlocked condition where the handle or the lid can be moved relative to the container.

In some aspects, the techniques described herein relate to an accessory attachment system, the system including an additional locking mechanism separate from the plate attachment interface and the accessory attachment interface that is movable between a locked position where the at least one accessory is prevented from being removed from the base plate and an unlocked position where the at least one accessory is allowed to be removed from the base plate.

In some aspects, the techniques described herein relate to an accessory attachment system, wherein the base plate is configured to be positioned within a vehicle cargo area that has a floor surface and at least one side wall extending upwardly from the floor surface in a vertical direction, and wherein the base plate includes at least one plate portion that is associated with the at least one side wall, and wherein the at least one accessory includes at least an accessory side wall extending in a vertical direction, and wherein the plate attachment interface is located in the at least one plate portion and the accessory attachment interface is located in the accessory side wall.

In some aspects, the techniques described herein relate to a method, including: a method of locking the lid or the handle in any configuration as described above, the method further including selectively powering a linear actuator or solenoid to move between the locked condition and the unlocked condition.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate accessory attachment system for a vehicle or stationary application. The system includes a base plate that provides an attachment interface for securing the accessories in place. The disclosure also provides for locking/unlocking features such that the accessories can be secured to the base plate and such that lids and handles of the accessories can be locked/unlocked as needed. Various types of accessories can be secured to the vehicle through the attachment interface provided by the base plate. The number and positions of base plates can be adjusted for particular vehicles or particular needs.

There are often situations where it would be useful for the vehicle owner to be able to switch between accessories to enable different functional capabilities, or to temporarily remove an accessory or module to allow the module or its contents to be used off the vehicle, then reattach the module once the desired operation or task is completed. The subject disclosure provides an integration method that allows a mechanical attachment to the vehicle via a quick connect/ disconnect capability, while also providing various lock features to make sure that the accessories are securely held in place.

Figure 1A:
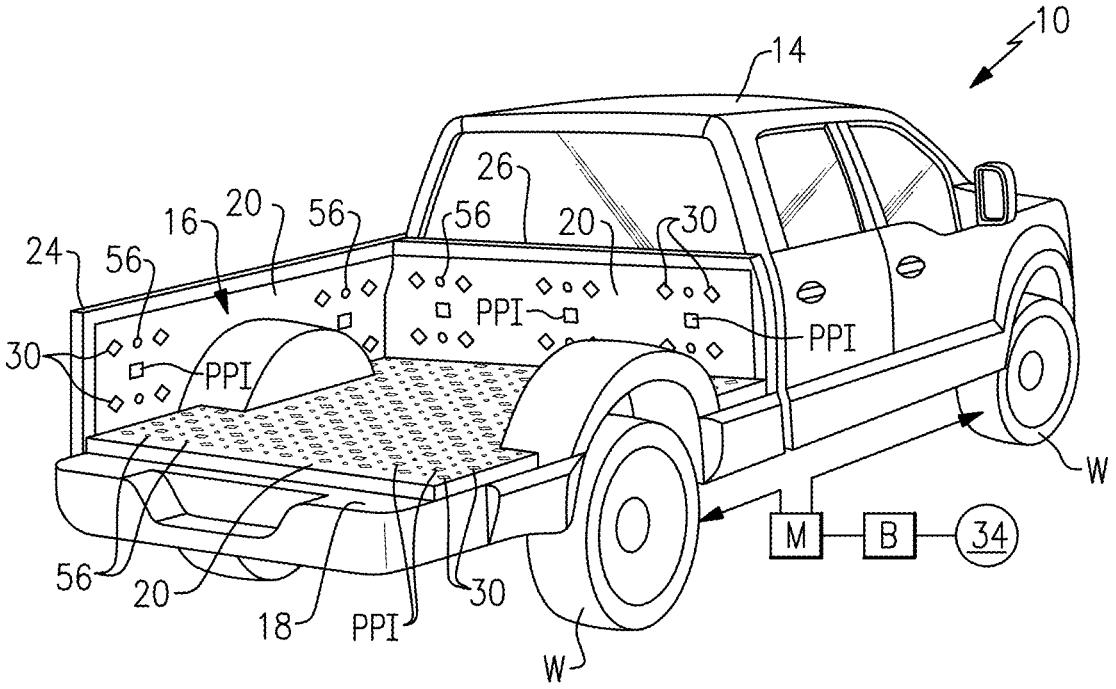
FIG. 1A illustrates a perspective view of a vehicle having a cargo bed equipped with base plates that can be used to secure an accessory according to an exemplary aspect of the present disclosure.
Figure 1B:
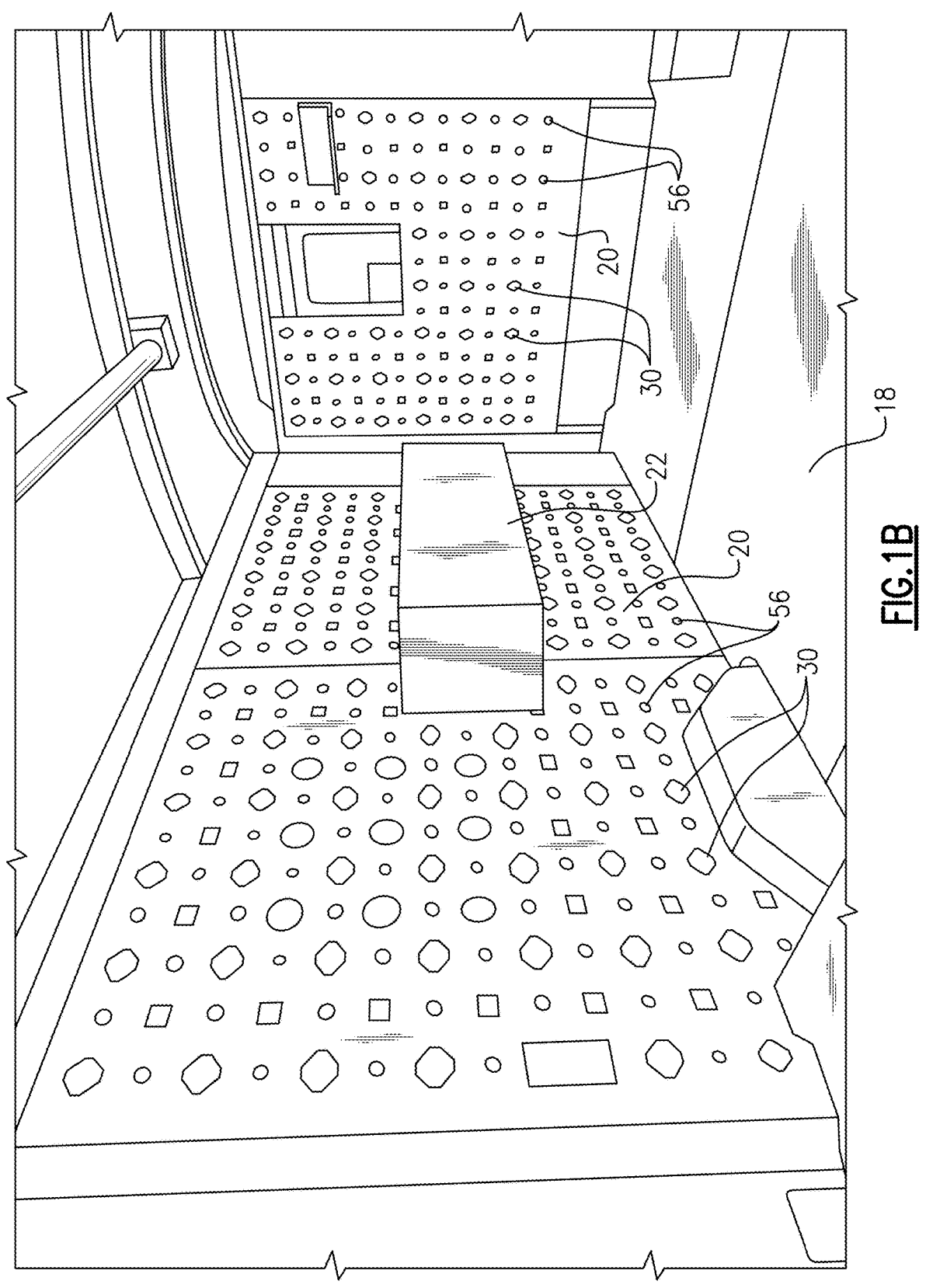
FIG. 1B illustrates a perspective view of a van having a cargo area equipped with base plates that can be used to secure accessories according to an exemplary aspect of the present disclosure.
Figure 2:
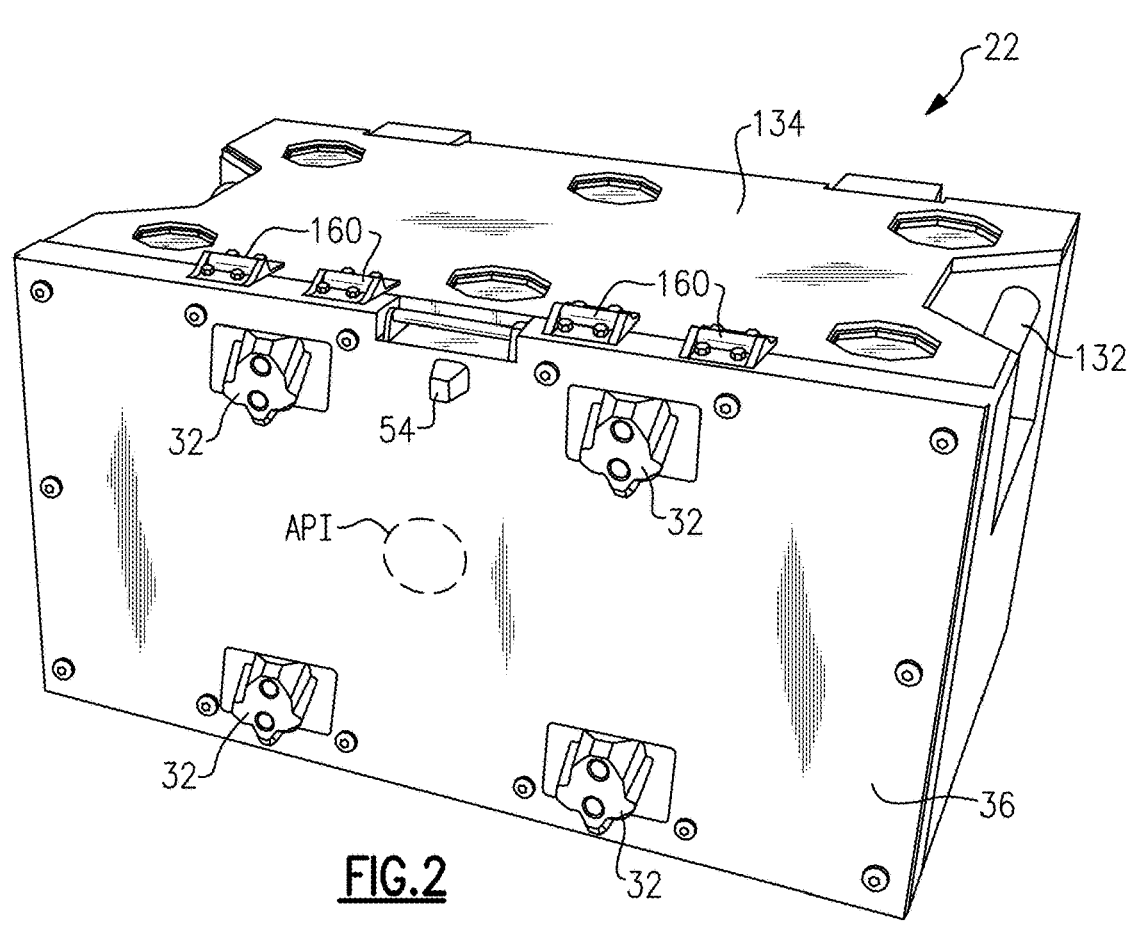
FIG. 2 illustrates an accessory box with a plurality of mounting feet on a side wall of the accessory box.

FIGS. 1-10 disclose exemplary embodiments of the accessory attachment and locking system that interfaces with a base plate. With reference to FIGS. 1A and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates the accessory attachment and locking system.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

In the exemplary embodiment, a plurality of base plates 20 are used to support one or more accessories and/or modules 22. In one example, the cargo bed 16 is defined by a pair of side walls 24 (only one is shown for purposes of clarity), a rear wall 26, and a tailgate (not shown). In one example, the base plates 20 are secured directly to walls 24, 26 and/or to the floor 18 of the cargo bed 16 by fastening, welding, etc., at a first connection interface. In another example, the base plates 20 can be supported for sliding movement within the cargo bed 16 on rails or other types of sliding structures. The accessories and/or modules 22 can be secured to the vehicle 10 by engaging one or more of the base plates 20 via a second connection interface. The accessories/modules 22 can include a lockable storage box that holds tools, a container, a refrigerator, etc. For example, the accessory 22 could be a lidded lockable container that includes a compartment for storing power tools or other items that require power or data connection.

As shown in FIGS. 1A-1B, the base plates 20 include a plurality of apertures 30. As shown in FIG. 2, an example accessory 22 comprises a lockable container or box 22 that includes one or more mounting feet 32. The box 22 can engage the base plate 20 using an attachment system comprising the plurality of apertures 30 and the mounting feet 32 that cooperate to provide a mechanical connection interface. In this example, the base plates 20 provide the apertures 30 and the accessories 22 include the feet 32. This could be rearranged, however, such that one or all of the feet 32 extend from the base plates 20 and the accessories 22 provide some or all of the apertures 30. The apertures 30 are spaced upwardly from the floor 18 or side wall 24, 26 by an open gap such that the feet 32 from the accessory 22 can be easily inserted into the base plate 20 to attach the accessory 22 to the base plate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory 22 having specialized tools for the second type of job.

As discussed above, in this example, the accessory 22 comprises a lockable box that is mechanically coupled to the vehicle 10 via the base plate 20. The accessory 22 could additionally include a power connection interface 34 that would be able to supply power to the box itself as well as any tools/devices within the box that would require charging. The power connection interface 34 is powered from the vehicle power supply, such as the battery pack B, for example. Any devices within the lockable box, e.g. rechargeable tools, could be recharged when set within the box and coupled to a charging interface associated with the power connection interface 34 between the accessory 22 and the base plate 20.

In one example, the base plate 20 can also be plugged into either 12V vehicle power or other power sources via a variety of connections/outlets. These power sources supply power to charge or power the accessories 22 via the power supply connection interface 34 associated with the base plate 20. Each accessory 22 has an accessory power interface (API) as shown in FIG. 2. At least some, or all, of the mounting locations for an accessory 22 have a charging interface with a plate power interface (PPI) as shown in FIGS. 1A-1B. The API and the PPI can be a direct electrical connection or can be via an inductive wireless charging connection. The PPI receive vehicle power via the vehicle power supply or other power source.

The subject disclosure provides for a side mounted attachment interface between the accessory box 22 and the base plate 20. In this example, the base plate 20 is configured to be positioned within the vehicle cargo bed 16 at the side wall 24 that extends upwardly from the floor surface in a vertical direction. The apertures 30 for this configuration are located on a plate portion of the base plate 20 that is associated with the side wall 24, and comprise a plate attachment interface located on an outwardly facing surface of the plate portion. The accessory box 22 includes at least one accessory side wall 36 extending in the vertical direction. The accessory side wall 36 includes an accessory attachment interface comprising the mounting feet 32 that connect to the plate attachment interface comprising the apertures 30.

Figure 3:
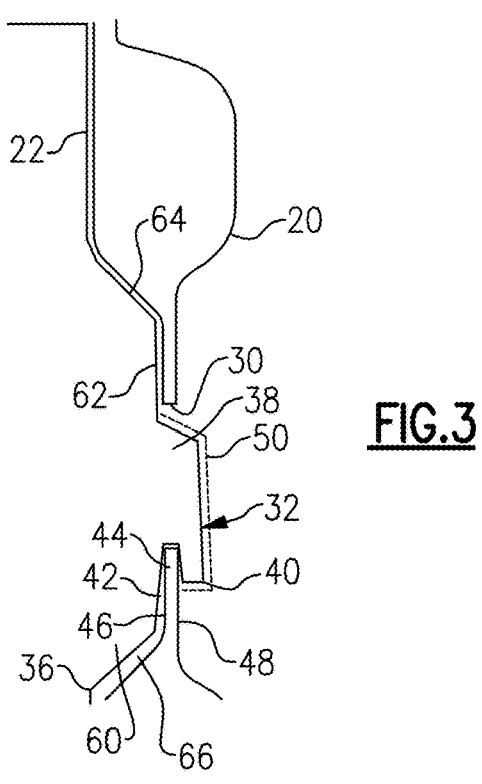
FIG. 3 is a section view of a mounting foot installed within an aperture of a base plate in a side mounted configuration.

In one example, each mounting foot 32 has a predefined shape that is configured to pull the accessory box 22 against the outer surface of the base plate 20 as the mounting foot 32 is inserted into the aperture 30 and moved vertically to a mounted position as shown in FIG. 3. Each mounting foot comprises a base body 38 that extends to a distal end 40 that is spaced from the accessory side wall 36 by a gap 42 that receives an edge portion 44 of a corresponding aperture 30 to attach the box 22 to the base plate 20. In one example, the distal end 40 extends downwardly from the base body 38 in the vertical direction to form the predefined shape as a lip or hook. In one example, the gap 42 decreases in size in a direction away from the distal end 40 and toward the base body 38 such that the gap 42 is narrower at the base body 38 than at the distal end 40. In one example, each foot 32 is tapered such that the distal end 40 is narrower than the base body 38. This tapered configuration continues to force the feet 32 into the mating surfaces surrounding the aperture 30 under various dimensional and wear conditions, which further reduces any loose conditions that would allow rattling of the accessory/module 22.

One example side attachment method includes aligning the mounting feet 32 of the box 22 to mounting apertures 30 on the side wall 24, 26 base plate portion. The distal ends 40 of the feet 32 are moved in a lateral direction, transverse to the vertical direction, to begin to enter the apertures 30. The distal ends 40 extend through a thickness of the base plate 20 at the aperture location from a first surface 46 of the base plate 20 to an opposite, second surface 48 of the base plate 20. Once the distal ends 40 have entered through the apertures 30 and have moved pass the second surface 48 of the base plate, the box 22 then moves downward in the vertical direction. In one example, the box moves downward by approximately 15-25 mm; however, this could vary dependent upon various factors such as sizes of the aperture and feet, type of accessory, etc.

As the box 22 moves downward, the shape of the feet 32 pulls the box 22 snug against the first surface 46 of the base plate 20. This is due to the decreasing size of the gap 42. The edge portion 44 of the base plate 20 fits tightly within the narrowest part of the gap 42 when in the mounted position to securely hold the box in place. This interference fit between the foot 32 and base plate 20 helps to prevent rattling.

In one example, each foot 32 has an additional layer 50 such that the feet 32 are covered in a plastic or similar material. In one example, the feet 32 are overmolded with plastic to act like a gasket to further prevent rattling. This provides a simplified side mount foot attachment interface that does not include moving parts within the foot itself resulting in a more economical and robust design.

Further, while the feet are shown on the side wall of the box, it is understood that the feet could be located on the bottom of the box to mount it to a horizontal base plate. Also, the accessory box is shown as having four feet; however, it should be understood that the number of feet can be greater than or less than four feet depending on the size of the accessory box.

When the accessory box 22 is attached to the base plate 20, the feet 32 are inserted into the corresponding apertures 30 to mechanically attach the accessory 22 to the base plate 20 in one of a plurality of mounting orientations. The accessory 22 can then be selectively detached from one mounting orientation on the base plate 20 such that the accessory 22 can immediately be reattached in a different one of the mounting orientations. The box is lifted in a vertical direction and then tilted outwardly such that the distal end 40 of the feet 32 can clear their respective apertures 30.

In one example, each foot 32 is formed to extend outwardly from a boss portion 60 that extends outwardly from the outer surface of the side wall of the box 22 as best shown in FIG. 3. The boss portion 60 has a flat center portion 62 with a tapered wall 64 that increases in an outer dimension in a direction extending away from the center portion 62 and toward the outer surface of the side wall of the box 22. The base plate 20 has a corresponding recess 66 on the first surface 46 that has the same shape as the boss portion 60. This further facilitates a snug and secure fit of the box 22 to the base plate 20.

In one example, the box 22 is held in place by a mechanical locking system 52 that prevents the 22 box from moving in an upward direction to allow the feet 32 to unhook from the base plate 20. In one example, the locking mechanism 52 is separate from the plate attachment interface and the accessory attachment interface, such that attaching and locking/unlocking can be separately and independently performed. The locking mechanism 52 is movable between a locked position where the accessory box 22 is prevented from being removed from the base plate 20 and an unlocked position where the accessory box 22 is allowed to be removed from the base plate 20.

Figures 4A, 4B:
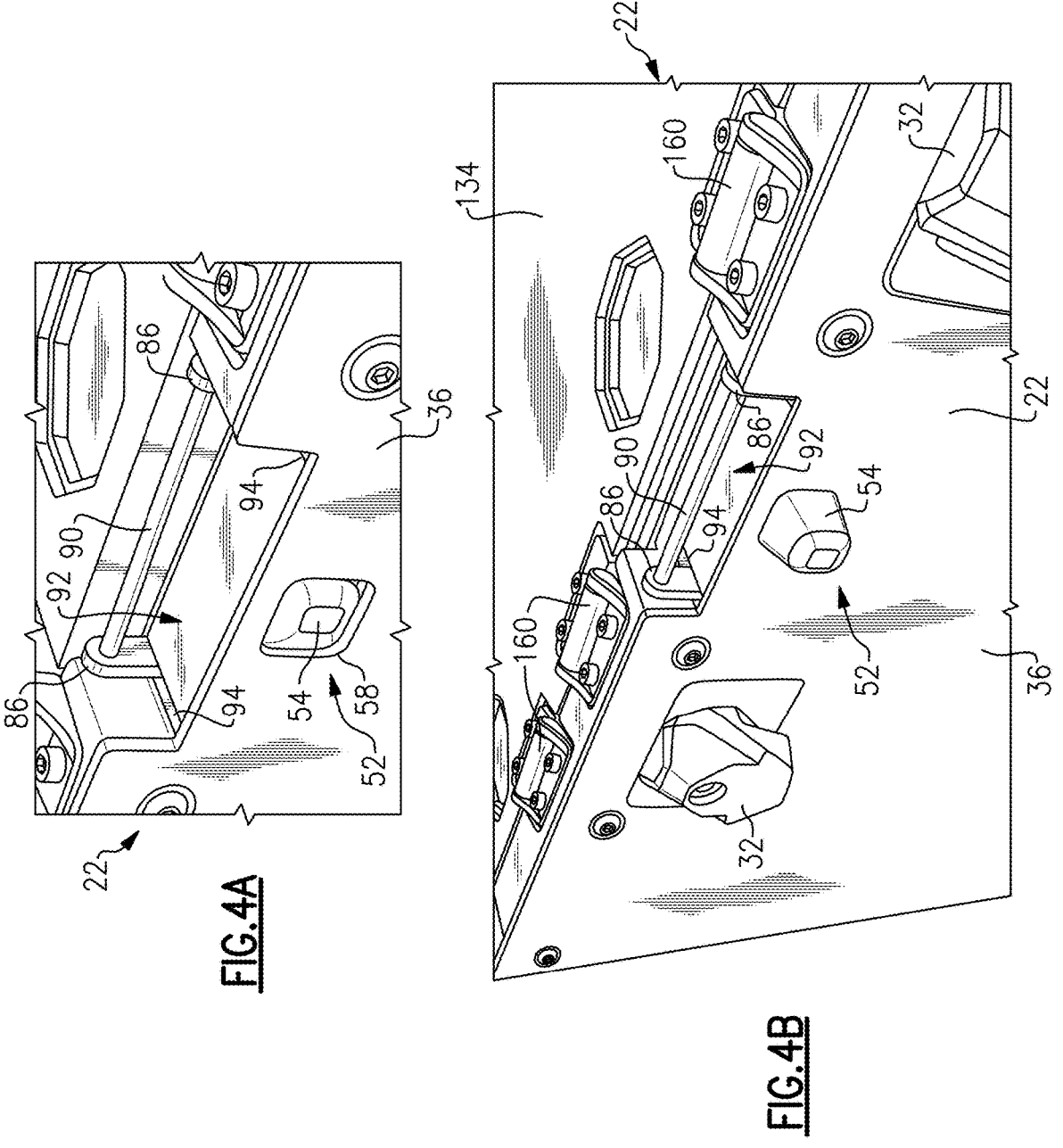
FIG. 4A is a perspective view of an accessory locking mechanism for locking the accessory box to the base plate, where the accessory locking mechanism is in an unlocked position.
FIG. 4B is a view similar to FIG. 4A but showing the accessory locking mechanism in a locked position.
Figure 5A:
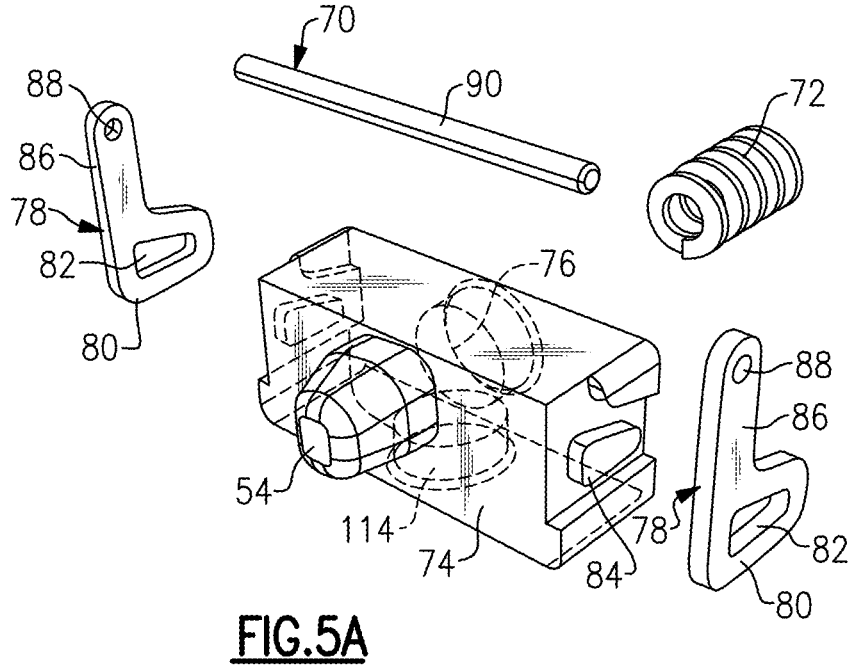
FIG. 5A is an exploded view of the accessory locking mechanism of FIGS. 4A-4B.
Figure 5B:
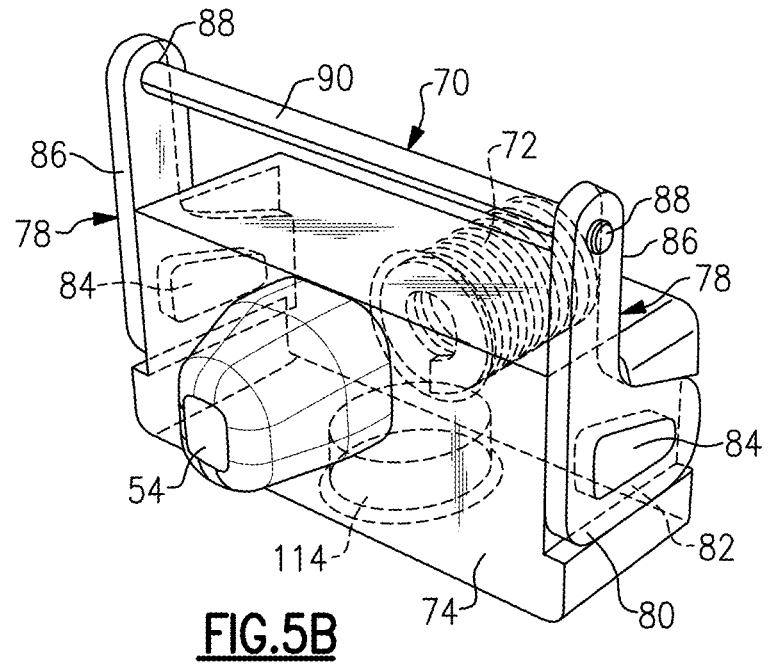
FIG. 5B is a perspective view of the accessory locking mechanism of FIG. 5A as assembled.

In one example, the locking mechanism 52 comprises a button 54 that is resiliently biased to extend into a corresponding button opening 56 (FIGS. 1 and 7) on the base plate 20 when the mounting feet 32 are fitted into corresponding apertures 30 to provide the locked position. As the distal ends 40 of the feet 32 are first inserted into the apertures 30, there is sufficient force to overcome the resilient biasing force such that the button 54 is compressed against the first surface 46 of the base plate 20 and is pushed within a recess 58 on the box 22 as shown in FIG. 4A. As the box 22 reaches the bottom of travel during insertion of the feet 32 through the apertures 30, the button 54 aligns with the corresponding button hole 56 and is resiliently biased to pop into the hole 56 to lock the box 22 to the base plate 20. In one example, the button 54 is tapered such that a cross-section of a distal end of the button 54 is narrower than a base end of the button 54. This further facilitates driving the feet 32 further into a wedged position to reduce rattling. FIG. 4B shows the button 54 in the extended position. In one example, the button 54 moves forwardly into the hole 56 by approximately 14 mm. Once fully extended, the button 54 prevents any upward movement of the box 22.

The button 54 can be actuated in various different ways. In one example, shown in FIGS. 4A-4B and 5A-5B, a button actuator 70 is used to slide the button 54 in a direction transverse to the vertical direction to compress a resilient member 72 to move the button 54 to the unlocked position. In this configuration, a button body 74 includes a recess or through hole 76 to receive the button 54. A pair of side arms 78 are attached to opposing sides of the button body 74. Each side arm 78 has an enlarged base 80 with an opening 82 that fits over a protrusion 84 formed on the side of the button body 74. An arm portion 86 extends upwardly from the enlarged base 80 to a distal end that includes an opening 88. The button actuator 70 comprises a pin body 90 that has opposite ends received within the corresponding openings 88 of the side arms 78. The resilient member 72 comprises any type of spring for example, and fits into the recess 76 that receives the button 54. The resilient member 72 reacts between the wall of the accessory 22 and a rear face of the button 54. The resilient member 72 is configured to bias the button 54 in the extended/locked position.

The button body 74 is mounted within the wall of the accessory box 22. In one example, button actuator 70 and distal ends of the arm portions 86 extend outwardly from within the accessory box 22 into a pocket area 92 on a rear edge of the box 22 as shown in FIGS. 4A-4B. The distal ends slide in the lateral direction within slots 94 formed at each end of the pocket area 92. The ends of the slots 94 define the maximum travel limit of the arms 78 and therefore also the button 54. To move the button 54 to the unlocked position, the button actuator 70 is moved in a direction toward the box 22 and away from the base plate 20 to compress the resilient member 72 and pull the button 54 out of the button hole 56. The feet 32 on the box 22 can then be lifted out of the apertures 30.

Figure 6:
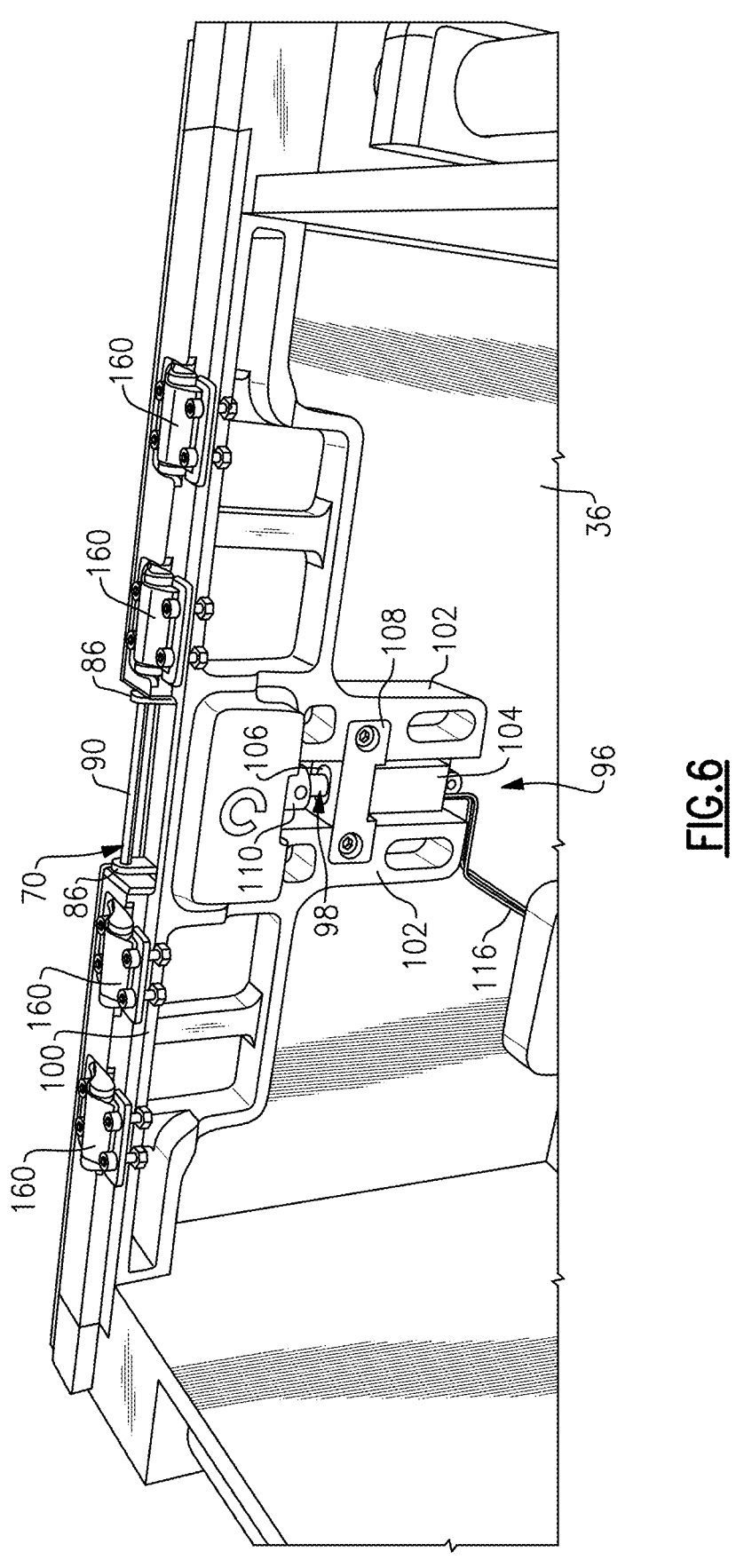
FIG. 6 is a perspective internal view of a rear wall of an accessory box with an accessory locking mechanism that includes an additional locking feature.
Figure 7:
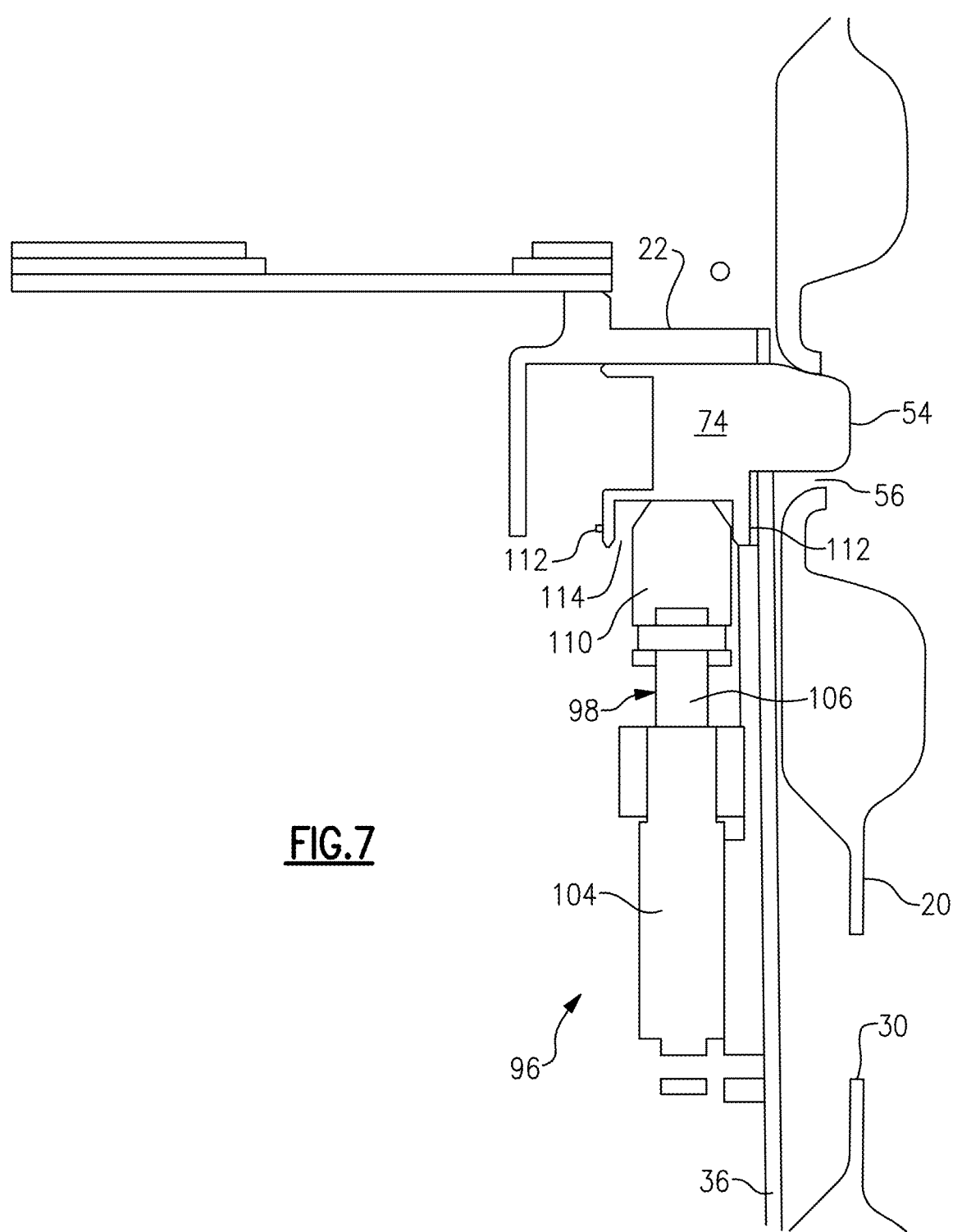
FIG. 7 is a section view of the locking feature of FIG. 6 in a locked position.

In one example, an additional locking mechanism 96 is used to prevent the movement of the button 54 between the locked and unlocked position. In one example, the additional locking mechanism 96 comprises a solenoid or linear actuator 98 as shown in FIGS. 6-7. In one example, the linear actuator 98 is mounted within the box 22 near an inner surface of the accessory side wall 36. The box 22 includes an upper wall structure 100 that extends along the upper edge of the accessory side wall 36. The upper wall structure 100 includes a pair of downwardly extending legs 102 that are spaced apart by a gap. In one example, the linear actuator 98 has an actuator body 104 fixed to the inner surface of the side wall 36 in the gap between the legs 102 and an extensible member 106 that moves back and forth in a linear direction relative to the actuator body 104. A mounting bracket 108 includes a portion that surrounds the actuator body 104 and includes flanges that are attached to the legs 102 to securely hold the linear actuator 98 in place.

As shown in FIG. 7, in one example, the linear actuator 98 includes an end cap 110 at the distal end of the extensible member 106. The button body 74 includes a pair of downwardly extending wall portions 112 that are spaced apart from each other to provide a recess or opening 114. When the end cap 110 is received within the recess 114, the button 54 is prevented from moving. When the end cap 110 is withdrawn from the recess 114 by the extensible member 106, the button 54 can be moved by the button actuator 70 to detach the accessory box 22 from the base plate 20. An electrical connection 116 at one end of the actuator body 104 connects the linear actuator 98 to the API to receive power from a vehicle power source via the power connection interface 34. As such, the linear actuator 98 can be selectively powered by a user to lock/unlock the button 54.

Figures 8A, 8B, 8C:
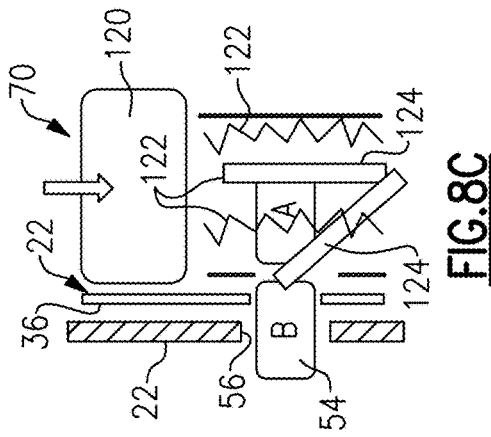
FIG. 8A is a perspective view of another example of an accessory locking mechanism for locking the accessory box to the base plate, where the accessory locking mechanism is in an unlocked position.
FIG. 8B is a view similar to FIG. 8A but showing the accessory locking mechanism in a locked position.
FIG. 8C is a schematic view of an internal mechanism of the accessory locking mechanism of FIGS. 8A-B.

FIGS. 8A-8C show another example of a button actuator 70 that is used to move the button 54 between unlocked and locked positions. In this example, the button actuator 70 comprises a bar body 120 that moves in a vertical direction to move the button 54 between the locked position and the unlocked position. In one example, the bar body 120 comprises an elongated bar that is received within the pocket 92 that is located at the upper edge of the side wall 36. FIG. 8A shows the button 54 in the unlocked position where the button 54 is retracted within a recess in the accessory side wall 36. FIG. 8B shows the button in the locked position where the button 54 is extended outwardly of the accessory side wall 36.

FIG. 8C schematically shows one example of a mechanism used to bias the button 54 to the locked position. In this example, a spring 122 and lever 124 are associated with the button 54 and bar body 120. One end of the spring 122 is connected to the bar body 120 and the opposite end of the spring 122 is connected to the lever 124, which is connected to the button 54. When the accessory foot 32 is initially inserted through the aperture 30 in the base plate 20, the button 54 is compressed within the recess in the side wall 36 until the button 54 reaches the button opening 56 in the base plate 20. Once the button 54 is aligned with the button opening 56, the biasing force of the spring 122 forces the button 54 outwardly into the opening 56. To release the button 54, the bar body 120 is then moved in an upward vertical direction to overcome the biasing force of the spring 122 and release the button 54 from the opening 56. In one example, the linear actuator 98 can also be used to prevent movement of the button 54 as described above.

The mechanism of the embodiment of FIGS. 8A-8C, provides a simplified configuration that has proven reliability and ensures a hundred percent lock or unlock motion to not be able to be placed in an intermittent mechanical state. In one example, the bar body 120 can include a rotating indicator 126 that is color coded to indicate a lock/unlock condition, e.g. red-green. As shown in FIGS. 8A and 8B the button 54 is sub-flush within the pocket 92 such that it cannot be actuated unintentionally. Additionally, with this configuration the up-down vertical motion is more user-friendly than the side-side motion toward the vehicle wall of the configuration of FIGS. 5A-5B.

Figure 9:
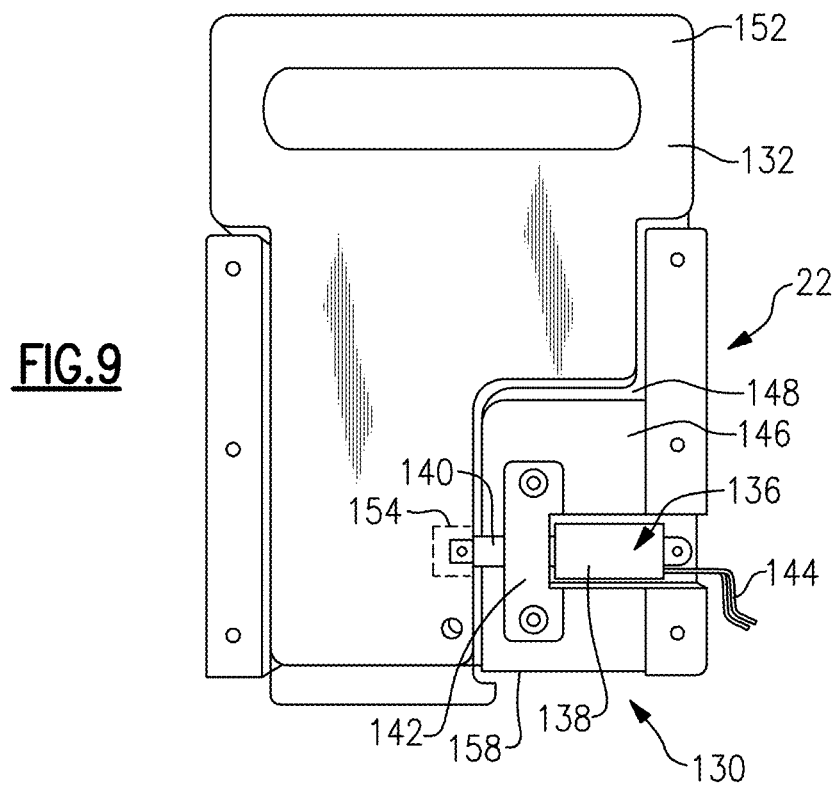
FIG. 9 is a side view of a handle locking mechanism.
Figure 10:
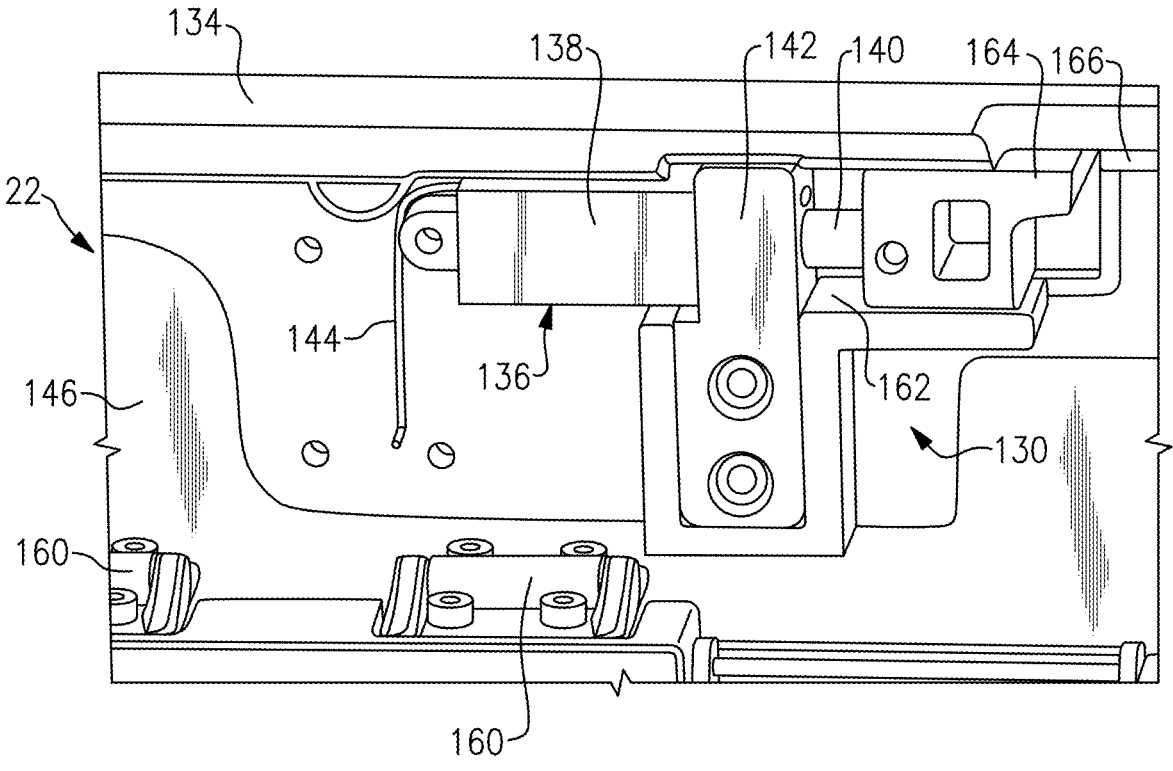
FIG. 10 is a side view of a lid locking mechanism.

FIGS. 9 and 10 show another example mechanism provided by the subject disclosure where an additional locking mechanism 130 is used to lock a handle 132 or lid 134 on the accessory box 22. The locking mechanism 130 is powered via the power connection interface 34 to allow the handle 132 and/or the lid 134 to be placed in a locked condition where the handle 132 or the lid 134 cannot be moved relative to the accessory box 22, or an unlocked condition where the handle 132 or the lid 134 can be moved relative to the accessory box 22.

In one example, the locking mechanism 130 comprises a solenoid or linear actuator 136 that is mounted within the box 22 near an inner surface of one of the walls of the box 22. In one example, the linear actuator 136 has an actuator body 138 fixed to one of the walls and an extensible member 140 that moves back and forth in a linear direction relative to the actuator body 138. A mounting bracket 142 is used to securely hold the linear actuator 136 in place. An electrical connection 144 at one end of the actuator body 138 connects the linear actuator 136 to the API via the power connection interface 34 to receive power from a vehicle power source. As such, the linear actuator 136 can be selectively powered by a user to lock/unlock the handle 132 or lid 134.

In the example shown in FIG. 9, the linear actuator 136 is used to lock/unlock the handle 132. An inner wall surface 146 of the box 22 includes a recess 148 that receives a handle body 150 for sliding movement therein. The upper end of the handle body 150 includes a grip 152 that a user can grasp to carry the box 22. While only one handle 132 is shown, it should be understood that the box 22 can include additional handles to facilitate transport of the box 22.

The actuator body 138 is mounted to the inner wall surface 146 adjacent to the handle body 150. The handle body 150 includes a recess or slot 154 that is aligned with the extensible member 140. When the extensible member 140 is received within the slot 154, the handle 132 is prevented from moving. Optionally, the distal end of the extensible member 140 may include an end cap 110 as described above. When the extensible member 140 is withdrawn from the slot 154, the handle 132 is unlocked. When unlocked, the handle 132 slides upwardly within the recess 148 to vertically extend the handle 132 to facilitate carrying of the box. A stop wall 158 is provided within the recess 148 to define an upward travel limit for the handle 132. In another example, movement of the handle 132, once unlocked, can also be used to unlock the button 54 to allow the box 22 to be removed from the base plate 20.

In the example shown in FIG. 10, the linear actuator 136 is used to lock/unlock the lid 134. The lid 134 is attached to the box 22 with a plurality of hinges 160. The inner wall surface 146 of the box 22 includes mounting area with a pocket 162 that receives the actuator 136 and bracket 142. The actuator body 138 is mounted to the inner wall surface 146 just underneath the lid 134. The distal end of the extensible member 140 includes a lock member 164 that interacts with a portion 166 of a wall of the box 22. When the lock member 164 is associated with the wall portion 166, the lid 134 is prevented from moving. When the lock member 164 is withdrawn from the wall portion 166, the lid 134 can be opened.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
   a base plate configured to be positioned within a vehicle cargo area that has a floor surface and at least one side wall extending upwardly from the floor surface in a vertical direction, and wherein the base plate includes at least one plate portion that is associated with the at least one side wall;
   a plate attachment interface located on an outwardly facing surface of the at least one plate portion;
   at least one accessory comprising at least an accessory side wall extending in the vertical direction, the accessory side wall including an accessory attachment interface to connect to the plate attachment interface;
   wherein one of the plate attachment interface and the accessory attachment interface comprises at least one mounting foot and the other of the plate attachment interface and the accessory attachment interface comprises at least one aperture, and wherein the at least one mounting foot is formed to extend outwardly from a boss portion that extends outwardly from an outer surface of the accessory side wall of the at least one accessory, and wherein the at least one mounting foot has a predefined shape that is configured to pull the at least one accessory against the base plate as the at least one mounting foot is inserted into the at least one aperture and moved vertically to a mounted position; and
   wherein the at least one aperture comprises a plurality of mounting apertures and a plurality of locking apertures that are separate from the plurality of mounting apertures, and wherein the plurality of mounting apertures comprise multiple rows that are spaced apart from each other in directions across both a width of the base plate and a length of the base plate, and wherein the plurality of locking apertures comprise multiple rows that are spaced apart from each other in directions across both the width of the base plate and the length of the base plate.

2. The accessory attachment system of claim 1, wherein the at least one mounting foot comprises a plurality of mounting fee and wherein the at least one aperture comprises a plurality of apertures, and where each foot comprises a base body that extends to a distal end that is spaced from the accessory side wall by a gap that receives an edge portion of a corresponding aperture to attach the accessory to the base plate.

3. The accessory attachment system of claim 2, wherein each foot is covered in a plastic material.

4. The accessory attachment system of claim 2, wherein the distal end extends downwardly from the base body to form the predefined shape as a hook, and wherein the gap decreases in size in a direction away from the distal end such that the gap is narrower at the base body than at the distal end.

5. The accessory attachment system of claim 1, including a locking mechanism that is separate from the plate attachment interface and the accessory attachment interface, and wherein the locking mechanism is movable between a locked position where the at least one accessory is prevented from being removed from the base plate and an unlocked position where the at least one accessory is allowed to be removed from the base plate.

6. The accessory attachment system of claim 5, wherein the locking mechanism comprises a button that is resiliently biased to extend into a corresponding button opening on the base plate when the at least one mounting foot is fitted into the at least one aperture to provide the locked position.

7. The accessory attachment system of claim 6, including
   an actuator that slides the button in a direction transverse to the vertical direction to compress a resilient member to move the button to the unlocked position, or
   an actuator that moves in the vertical direction to unlock the button.

8. A method of using the accessory attachment system of claim 1, the method including:
   attaching the at least one accessory to the base plate;
   inserting the at least one mounting foot into the at least one aperture, and
   moving the at least one accessory in the vertical direction to hook the at least one accessory to the base plate.

9. An accessory attachment system, comprising:
   a base plate configured to be positioned within a vehicle cargo area that has a floor surface and at least one side wall extending upwardly from the floor surface in a vertical direction, and wherein the base plate includes at least one plate portion that is associated with the at least one side wall;
   a plate attachment interface located on an outwardly facing surface of the at least one plate portion;
   at least one accessory comprising at least an accessory side wall extending in the vertical direction, the accessory side wall including an accessory attachment interface to connect to the plate attachment interface; and
   wherein one of the plate attachment interface and the accessory attachment interface comprises at least one mounting foot and the other of the plate attachment interface and the accessory attachment interface comprises at least one aperture, and wherein the at least one mounting foot has a predefined shape that is configured to pull the at least one accessory against the base plate as the at least one mounting foot is inserted into the at least one aperture and moved vertically to a mounted position; and
   wherein the at least one accessory comprises a container that includes at least one handle and/or a lid, and including:
   a power connection interface between the base plate and the at least one accessory to provide power to the at least one accessory, and
   at least one locking mechanism powered via the power connection interface to lock at least one of the handle and the lid in a locked condition where the handle or the lid cannot be moved relative to the container or an unlocked condition where the handle or the lid can be moved relative to the container.

10. An accessory attachment system, comprising:
   a base plate that provides a plate attachment interface on an outwardly facing surface;
   at least one accessory including an accessory attachment interface to connect to the plate attachment interface;

one of the plate attachment interface and the accessory attachment interface comprises at least one mounting foot and the other of the plate attachment interface and the accessory attachment interface comprises at least one aperture, wherein the at least one mounting foot is formed to extend outwardly from a boss portion that extends outwardly from an outer surface of a wall of the at least one accessory, and wherein the at least one mounting foot is inserted into the at least one aperture to connect the at least one accessory to the base plate;

a locking mechanism separate from the at least one mounting foot and the at least one aperture, the locking mechanism being movable between a locked position where the at least one accessory is prevented from being removed from the base plate and an unlocked position where the at least one accessory is allowed to be removed from the base plate; and wherein the at least one aperture comprises a plurality of mounting apertures and a plurality of locking apertures that are separate from the plurality of mounting apertures, and wherein the plurality of mounting apertures comprise multiple rows that are spaced apart from each other in directions across both a width of the base plate and a length of the base plate, and wherein the plurality of locking apertures comprise multiple rows that are spaced apart from each other in directions across both the width of the base plate and the length of the base plate.

11. The accessory attachment system of claim 10, wherein the locking mechanism comprises a mechanical locking mechanism configured to be actuated by user input.

12. The accessory attachment system of claim 11, wherein the locking mechanism comprises a button that is resiliently biased to extend into a corresponding button opening on the base plate when the at least one mounting foot is fitted into the at least one aperture to provide the locked position.

13. The accessory attachment system of claim 12, wherein the locking mechanism includes an actuator that slides the button in a direction transverse to a vertical direction to compress a resilient member to move the button to the unlocked position, or an actuator that moves in the vertical direction to unlock the button.

14. The accessory attachment system of claim 10, wherein the base plate is configured to be positioned within a vehicle cargo area that has a floor surface and at least one side wall extending upwardly from the floor surface in a vertical direction, and wherein the base plate includes at least one plate portion that is associated with the at least one side wall, and wherein the at least one accessory includes at least an accessory side wall extending in a vertical direction, and wherein the plate attachment interface is located in the at least one plate portion and the accessory attachment interface is located in the accessory side wall.

15. A method of using the accessory attachment system of claim 10, the method including:

locking the at least one accessory to the base plate by biasing a lock button to extend into a corresponding lock button opening in the base plate as the at least one mounting foot is inserted into the at least one aperture and moved to a mounted position.

16. An accessory attachment system, comprising:

a base plate that provides a plate attachment interface on an outwardly facing surface;

at least one accessory including an accessory attachment interface to connect to the plate attachment interface;

one of the plate attachment interface and the accessory attachment interface comprises at least one mounting foot and the other of the plate attachment interface and the accessory attachment interface comprises at least one aperture, wherein the at least one mounting foot is inserted into the at least one aperture to connect the at least one accessory to the base plate;

a locking mechanism separate from the at least one mounting foot and the at least one aperture, the locking mechanism being movable between a locked position where the at least one accessory is prevented from being removed from the base plate and an unlocked position where the at least one accessory is allowed to be removed from the base plate; and the at least one accessory comprising a container that includes at least one handle and/or a lid, and including:

a power connection interface between the base plate and the at least one accessory to provide power to the at least one accessory, and at least one accessory locking mechanism powered via the power connection interface to lock at least one of the handle and the lid in a locked condition where the handle or the lid cannot be moved relative to the container or an unlocked condition where the handle or the lid can be moved relative to the container.

17. An accessory attachment system, comprising:

a base plate that provides a plate attachment interface on an outwardly facing surface, wherein the plate attachment interface comprises a plurality of mounting apertures that provide a plurality of different mounting locations;

at least one accessory including an accessory attachment interface to connect to the plate attachment interface at one of the plurality of different mounting locations via one or more of the plurality of mounting apertures, and wherein the at least one accessory comprises a container that includes at least one handle and/or a lid;

a power connection interface between the base plate and the at least one accessory to provide power to the at least one accessory, wherein the at least one accessory has at least one accessory power interface and the base plate includes a plurality of plate power interfaces that are separate from the plurality of mounting apertures, wherein each mounting location on the base plate includes at least one plate power interface; and at least one accessory locking mechanism powered via the power connection interface to allow at least one of the handle and the lid to be placed in a locked condition where the handle or the lid cannot be moved relative to the container or an unlocked condition where the handle or the lid can be moved relative to the container, and wherein power is supplied to the at least one accessory locking mechanism when the accessory power interface is aligned with the plate power interface as the accessory attachment interface is connected to the plate attachment interface.

18. The accessory attachment system of claim 17, including an additional locking mechanism separate from the plate attachment interface and the accessory attachment interface that is movable between a locked position where the at least one accessory is prevented from being removed from the base plate and an unlocked position where the at least one accessory is allowed to be removed from the base plate.

19. The accessory attachment system of claim 17, wherein the base plate is configured to be positioned within a vehicle cargo area that has a floor surface and at least one side wall extending upwardly from the floor surface in a vertical direction, and wherein the base plate includes at least one plate portion that is associated with the at least one side wall, and wherein the at least one accessory includes at least an accessory side wall extending in a vertical direction, and wherein the plate attachment interface is located in the at least one plate portion and the accessory attachment interface is located in the accessory side wall.

20. A method using the accessory attachment system of claim 17, the method including:

connecting the at least one accessory to the base plate;

powering the at least one accessory via the power connection interface between the base plate and the at least one accessory;

selectively powering a linear actuator or solenoid to move the lid or the handle between the locked condition and the unlocked condition.

21. An accessory attachment system, comprising:

a base plate that provides a plate attachment interface on an outwardly facing surface;

at least one accessory including an accessory attachment interface to connect to the plate attachment interface;

one of the plate attachment interface and the accessory attachment interface comprises at least one mounting foot and the other of the plate attachment interface and the accessory attachment interface comprises at least one aperture, wherein the at least one mounting foot is formed to extend outwardly from a boss portion that extends outwardly from an outer surface of a wall of the at least one accessory, and wherein the at least one mounting foot is inserted into the at least one aperture to connect the at least one accessory to the base plate;

a locking mechanism separate from the at least one mounting foot and the at least one aperture, the locking mechanism being movable between a locked position where the at least one accessory is prevented from being removed from the base plate and an unlocked position where the at least one accessory is allowed to be removed from the base plate; and wherein each mounting foot comprises a base body that extends to a distal end that is spaced from the wall by a gap that receives an edge portion of the at least one aperture, and wherein the distal end extends transversely from one edge of the base body to form a lip or hook, and wherein the gap decreases in size in a direction away from the distal end and toward the base body such that the gap is narrower at the base body than at the distal end, and wherein the boss portion has a tapered wall that increases in an outer dimension in a direction extending away from the distal end and toward the wall.

22. An accessory attachment system, comprising:

a base plate configured to be positioned within a vehicle cargo area that has a floor surface and at least one side wall extending upwardly from the floor surface in a vertical direction, and wherein the base plate includes at least one plate portion that is associated with the at least one side wall;

a plate attachment interface located on an outwardly facing surface of the at least one plate portion;

at least one accessory comprising at least an accessory side wall extending in the vertical direction, the accessory side wall including an accessory attachment interface to connect to the plate attachment interface;

wherein one of the plate attachment interface and the accessory attachment interface comprises at least one mounting foot and the other of the plate attachment interface and the accessory attachment interface comprises at least one aperture, and wherein the at least one mounting foot is formed to extend outwardly from a boss portion that extends outwardly from an outer surface of the accessory side wall of the at least one accessory, and wherein the at least one mounting foot has a predefined shape that is configured to pull the at least one accessory against the base plate as the at least one mounting foot is inserted into the at least one aperture and moved vertically to a mounted position; and wherein each mounting foot comprises a base body that extends to a distal end that is spaced from the accessory side wall by a gap that receives an edge portion of the at least one aperture, and wherein the distal end extends transversely from one edge of the base body to form a lip or hook, and wherein the gap decreases in size in a direction away from the distal end and toward the base body such that the gap is narrower at the base body than at the distal end, and wherein the boss portion has a tapered wall that increases in an outer dimension in a direction extending away from the distal end and toward the wall.

* * * * *